United States Patent
Jiang et al.

(10) Patent No.: US 11,564,236 B2
(45) Date of Patent: Jan. 24, 2023

(54) TRANSMISSION CONTROL METHOD, RELATED DEVICE AND SYSTEM

(71) Applicant: VIVO MOBILE COMMUNICATION CO., LTD., Chang'an Dongguan (CN)

(72) Inventors: Dajie Jiang, Chang'an Dongguan (CN); Xueming Pan, Chang'an Dongguan (CN); Yu Ding, Chang'an Dongguan (CN); Fei Qin, Chang'an Dongguan (CN); Sanjun Feng, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 367 days.

(21) Appl. No.: 16/646,077

(22) PCT Filed: Aug. 14, 2018

(86) PCT No.: PCT/CN2018/100429
§ 371 (c)(1),
(2) Date: Mar. 10, 2020

(87) PCT Pub. No.: WO2019/047681
PCT Pub. Date: Mar. 14, 2019

(65) Prior Publication Data
US 2020/0260459 A1 Aug. 13, 2020

(30) Foreign Application Priority Data
Sep. 11, 2017 (CN) .......................... 201710813749.1

(51) Int. Cl.
*H04W 72/08* (2009.01)
*H04W 72/04* (2009.01)

(52) U.S. Cl.
CPC ....... *H04W 72/082* (2013.01); *H04W 72/042* (2013.01); *H04W 72/0446* (2013.01)

(58) Field of Classification Search
CPC ............. H04W 72/082; H04W 72/042; H04W 72/0446
See application file for complete search history.

(56) References Cited

U.S. PATENT DOCUMENTS

| 2012/0155303 A1 | 6/2012 | Kuo |
| 2013/0028201 A1 | 1/2013 | Koo et al. |

(Continued)

FOREIGN PATENT DOCUMENTS

| CN | 103250363 A | 8/2013 |
| CN | 103583064 A | 2/2014 |

(Continued)

OTHER PUBLICATIONS

Chinese Search Report Application No. 201710813749.1; reported on Jun. 2, 2020.

(Continued)

*Primary Examiner* — Melvin C Marcelo
(74) *Attorney, Agent, or Firm* — von Briesen & Roper, s.c.

(57) ABSTRACT

A transmission control method, a related device and system are provided. The method includes: receiving a TDM pattern sent by a base station, where the TDM pattern is configured to indicate an uplink resource and/or a downlink resource available for the UE, and the base station is a serving base station of the UE; and performing a transmission control according to the TDM pattern.

19 Claims, 6 Drawing Sheets

(56) References Cited

U.S. PATENT DOCUMENTS

| | | | |
|---|---|---|---|
| 2013/0208641 A1 | 8/2013 | Sudhir et al. | |
| 2014/0022972 A1 | 1/2014 | Ahn et al. | |
| 2014/0211766 A1 | 7/2014 | Zhao et al. | |
| 2014/0334330 A1 | 11/2014 | Sudhir et al. | |
| 2015/0163801 A1 | 6/2015 | Sadek et al. | |
| 2016/0073345 A1 | 3/2016 | Fan et al. | |
| 2016/0192323 A1 | 6/2016 | Kim et al. | |
| 2018/0263048 A1* | 9/2018 | Ingale | H04W 72/1215 |
| 2020/0196326 A1* | 6/2020 | Li | H04W 72/1215 |

FOREIGN PATENT DOCUMENTS

| | | |
|---|---|---|
| CN | 103988536 A | 8/2014 |
| CN | 104244464 A | 12/2014 |
| CN | 105164938 A | 12/2015 |
| CN | 105453652 A | 3/2016 |
| EP | 2737766 A1 | 6/2014 |
| WO | 2014027790 A1 | 2/2014 |
| WO | 2017048024 A1 | 3/2017 |

OTHER PUBLICATIONS

International Search Report & Written Opinion related to Application No. PCT/CN2018/100429; reported on Aug. 14, 2018.
Extended European Search Report for related Application No. 18854570.1; reported on Oct. 15, 2020.
Guangdong Oppo Mobile Telecom, "Discussion on the NR-LTE self-interference issue", Jun. 27-30, 2017, 3GPP TSG RAN WG1 NR Ad-Hoc #2, Qingdao, P.R. China.
VIVO, "Interference analysis for LTE-NR co-existence", Jun. 27-30, 2017,, 3GPP TSG RAN WG1 NR Ad-Hoc #2, Qingdao, P.R. China.

* cited by examiner

TRANSMISSION CONTROL METHOD, RELATED DEVICE AND SYSTEM

CROSS-REFERENCE TO RELATED APPLICATION

This patent application is a 35 USC § 371 U.S. national stage of International Application No. PCT/CN2018/100429 filed on Aug. 14, 2018, which claims priority to Chinese Patent Application No. 201710813749.1 filed on Sep. 11, 2017, which is incorporated herein by reference in its entirety.

TECHNICAL FIELD

The present disclosure relates to the field of communications technologies, and in particular, to a transmission control method, a related device and system.

BACKGROUND

The interference problem has always existed in communication technology, and the interference has seriously affected the communication performance of the User Equipment (UE). The common interferences include the interference between different terminals, interference between different systems, etc. However, with the development of communication technology and increasing people's requirements for the performance of UEs, another type of interference, i.e., an intra-UE interference has been paid more and more attention by the people. The intra-UE interference refers to that the interference generated by the signal transmitted by the UE itself affects the received signal of the UE. For example, the uplink signal transmitted by the UE interferes with the downlink signal of the UE. Due to the intra-UE interference, the transmission performance of UEs is poor.

SUMMARY

In a first aspect, a transmission control method is provided in the embodiments of the present disclosure, applied to a UE, including:

receiving a Time Division Multiplexing (TDM) pattern sent by a base station, where the TDM pattern is configured to indicate an uplink resource and/or a downlink resource available for the UE, and the base station is a serving base station of the UE; and performing a transmission control according to the TDM pattern.

In a second aspect, a transmission control method is provided in the embodiments of the present disclosure, applied to a base station, including:

generating a Time Division Multiplexing (TDM) pattern, where the TDM pattern is configured to indicate an uplink resource and/or a downlink resource available for the UE; and sending the TDM pattern to the UE, to enable the UE to perform a transmission control according to the TDM pattern.

In a third aspect, a UE is provided in the embodiments of the present disclosure, including:

a receiving module, configured to receive a Time Division Multiplexing (TDM) pattern sent by a base station, where the TDM pattern is configured to indicate an uplink resource and/or a downlink resource available for the UE, and the base station is a serving base station of the UE; and a controlling module, configured to perform a transmission control according to the TDM pattern.

In a fourth aspect, a base station is provided in the embodiments of the present disclosure, including:

a generating module, configured to generate a Time Division Multiplexing (TDM) pattern, where the TDM pattern is configured to indicate an uplink resource and/or a downlink resource available for the UE; and a sending module, configured to send the TDM pattern to the UE, to enable the UE to perform a transmission control according to the TDM pattern.

In a fifth aspect, a UE is provided in the embodiments of the present disclosure, including: a memory, a processor and a transmission control program stored in the memory and operable on the processor, where the transmission control program is executed by the processor to perform the transmission control method in the embodiments of the present disclosure.

In a sixth aspect, a base station is provided in the embodiments of the present disclosure, including: a memory, a processor and a transmission control program stored in the memory and operable on the processor, where the transmission control program is executed by the processor to perform the transmission control method in the embodiments of the present disclosure.

In a seventh aspect, a transmission control system is provided in the embodiments of the present disclosure, including the UE and the base station in the embodiments of the present disclosure.

In an eighth aspect, a computer-readable storage medium storing a transmission control program is provided in the embodiments of the present disclosure, where the transmission control program is executed by a processor to perform the transmission control method in the embodiments of the present disclosure.

In a ninth aspect, a computer-readable storage medium storing a transmission control program is provided in the embodiments of the present disclosure, where the transmission control program is executed by a processor to perform the transmission control method in the embodiments of the present disclosure.

BRIEF DESCRIPTION OF THE DRAWINGS

In order to illustrate the technical solution of the embodiments of the present disclosure more clearly, the drawings used in the description of the embodiments of the present disclosure will be briefly introduced below. Obviously, the drawings in the following description are merely some embodiments of the present disclosure. For those of ordinary skill in the art, other drawings may be obtained based on these drawings without creative work.

DETAILED DESCRIPTION

The technical solutions in the embodiments of the present disclosure will be clearly and completely described below with reference to the accompanying drawings in the embodiments of the present disclosure. Obviously, the described embodiments are part of the embodiments of the present disclosure, but not all of the embodiments. Based on the embodiments in the present disclosure, all other embodiments obtained by a person of ordinary skill in the art without creative work fall within the scope of the present disclosure.

The terms "first", "second", and the like in the specification and claims of this application are used to distinguish similar objects, and are not necessarily used to describe a specific order or sequence. It should be understood that the data used in this way may be interchanged where appropriate, so that the embodiments of the disclosure described herein may be performed in a sequence other than those illustrated or described herein. Furthermore, the terms "comprising" and "comprise" and any of their variations are intended to cover non-exclusive inclusions, for example, a process, method, system, product, or device that includes a series of steps or units need not be limited to those explicitly listed. Those steps or units may instead include other steps or units not explicitly listed or inherent to these processes, methods, products or equipment. In addition, the use of "and/or" in the specification and in the claims means at least one of the connected objects, such as A and/or B and/or C, means that it includes A alone, B alone, C alone, and both A and B. There are 7 cases where B and C are present, A and C are present, and A, B and C are present.

Figure 1:
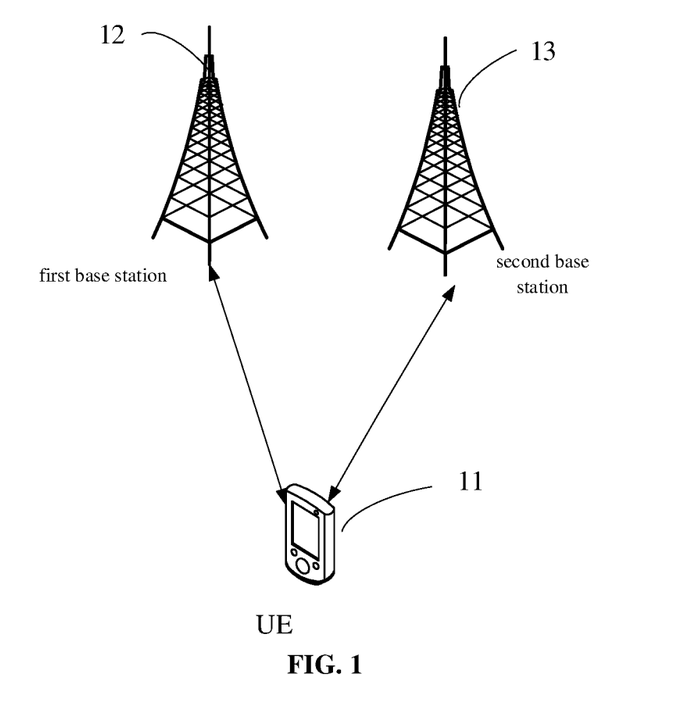
FIG. 1 is a structural diagram of a transmission control system in an embodiment of the present disclosure.

Referring to FIG. 1, FIG. 1 is a structural diagram of a transmission control system in an embodiment of the present disclosure. As shown in FIG. 1, the system includes a UE 11 and a base station. In FIG. 1, the base station includes a first base station 12 or a second base station 13. For example, the UE 11 may be UE (User Equipment), for example, it may be a mobile phone, a tablet personal computer, a laptop computer, a personal digital assistant (PDA), or a mobile device. Terminal-side devices such as a mobile Internet device (MID) or a wearable device (Wearable Device), it should be noted that the type of the UE 11 is not limited in the embodiment of the present disclosure. The UE 11 may establish communication with the first base station 12 and the second base station 13 at the same time. The first base station 12 and the second base station 13 are base stations in two different systems. For example, the above-mentioned first base station 12 may be in the first system, where the first system may be a Long Term Evolution (LTE) system or a 5G New Radio (NR) system, and the second base station 13 may be in the second system, where the second system may be an NR system or an LTE system. That is, the first base station 12 is an LTE base station, and the second base station 13 is an NR base station, or the first base station 12 is an NR base station, and the second base station 13 is an LTE base station.

In the embodiment of the present disclosure, the first system and the second system may be tightly coupled in a Dual Connectivity (DC) mode. One system acts as a master node (MN) and the other system acts as a secondary node (SN). In a dual-connected system, two cell groups are included, which are a master cell group (MCG) and a secondary cell group (SCG). The primary cell group may include a primary cell (PCell) and one or more secondary cells (SCells), and the secondary cell group may include a primary and secondary cell (PSCell), and one or more SCells.

In the above network system, the UE 11 may perform a data transmission with the first base station 12 and the second base station 13 at the same time, or may perform a data transmission with the first base station 12 and the second base station 13 at different times, which is not limited in the embodiment of the present disclosure.

Figure 2:
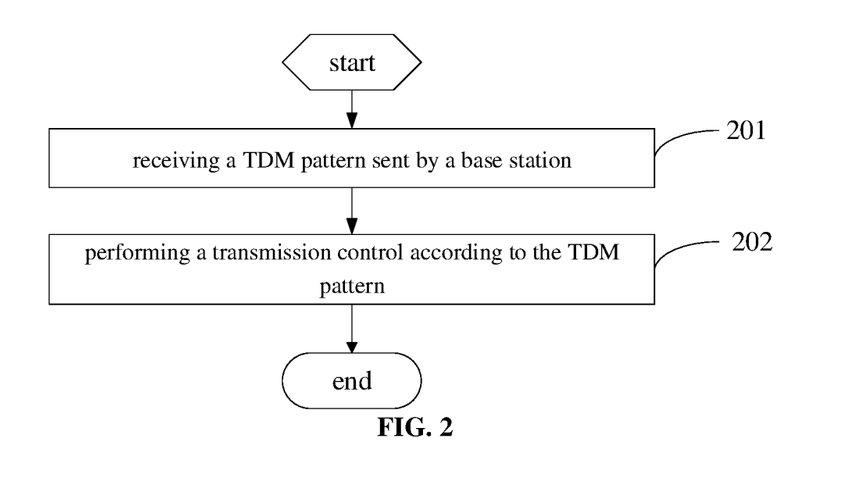
FIG. 2 is a flowchart of a transmission control method in an embodiment of the present disclosure.

Referring to FIG. 2, FIG. 2 is a flowchart of a transmission control method in an embodiment of the present disclosure. The method is applied to a UE. As shown in FIG. 2, the method includes the following steps:

Step 201: receiving a Time Division Multiplexing (TDM) pattern sent by a base station, where the TDM pattern is configured to indicate an uplink resource and/or a downlink resource available for the UE, and the base station is a serving base station of the UE.

It should be noted that, the base station may be a first base station or a second base station in the transmission control system shown in FIG. 1.

The above TDM pattern can be understood to indicate to the UE that the uplink and downlink of the frequency band combination that will generate a harmonic interference do not work simultaneously, and/or the LTE uplink, the LTE downlink and the NR downlink of the frequency band combination that generates an intermodulation interference do not work simultaneously. Optionally, the above TDM pattern may be a set of binary characters, for example: [10101010], the [10101010] may indicate that the UE that receives the signaling can only transmit in Slot 0, 2, 4 and 6, that is, indicate that the available uplink resources of the UE are Slot 0, 2, 4 and 6.

The above TDM pattern can realize that the uplink and downlink of the frequency band combination where the UE will generate the harmonic interference do not work at the same time, and the uplink and downlink of the frequency band combination where the UE will generate the intermodulation interference do not work at the same time. For example, the TDM pattern may be a TDM pattern generated by the base station to avoid intra-UE interference from the UE. For example, the TDM pattern may be generated by the base station according to a scheduling result of the second base station for the UE. For the harmonic interference shown in FIG. 3, the uplink resources configured by the LTE base station and the downlink transmission of the NR base station for the UE are in different slots, so as to avoid the harmonic interference. For another example: for the intermodulation interference shown in FIG. 4, the uplink resources configured by the NR base station and the uplink transmission of the LTE base station for the UE are in different slots, so as to avoid the intermodulation interference.

Optionally, in the embodiment of the present disclosure, the uplink resource may be an uplink slot, and the downlink resource may be a downlink slot, or the uplink resource may be an uplink physical resource block (PRB), and the downlink resource may be a downlink PRB. The uplink PRB and the downlink PRB may avoid the intra-UE interference of the UE. For example, the uplink and downlink of the UE are configured through the above-mentioned TDM pattern to transmit in a PRB that does not interfere with each other. Of course, in some embodiments, the uplink resource may also be an uplink subframe, and the downlink resource may be a downlink subframe.

Step 202: performing a transmission control according to the TDM pattern.

In, Step 202, the transmission may be performed on the uplink resource and/or the downlink resource indicated by the TDM pattern, so as to effectively avoid self-interference of the terminal and improve the transmission performance of the UE. Certainly, in some scenarios, the transmission may also be performed on resources other than the uplink resources and/or downlink resources indicated by the TDM pattern according to the above TDM pattern, which is not limited in this embodiment of the present disclosure.

In this embodiment, by receiving a TDM pattern sent by a base station and performing a transmission control according to the TDM pattern, it is able to effectively avoid the intra-UE interference and improve the transmission performance of the UE.

Figure 5:
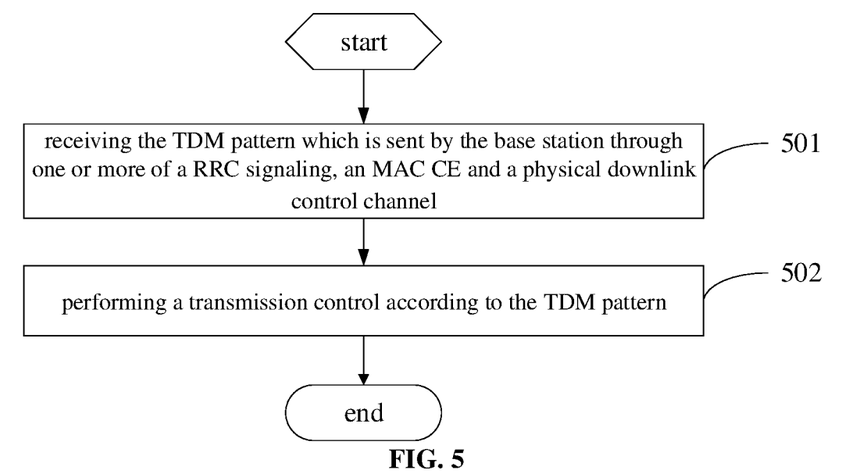
FIG. 5 is a flowchart of another transmission control method in an embodiment of the present disclosure.

Referring to FIG. 5, FIG. 5 is a flowchart of another transmission processing method in an embodiment of the present disclosure. The method is applied to a UE. As shown in FIG. 5, the method includes the following steps:

Step 501: receiving the TDM pattern which is sent by the base station through one or more of a Radio Resource Control (RRC) signaling, a Media Access Control (MAC) Control Unit (CE) and a physical downlink control channel, where the TDM pattern is configured to indicate an uplink resource and/or a downlink resource available for the UE, and the base station is a serving base station of the UE.

The receiving the TDM pattern through the above multiple items may be transmitting part of the content of the TDM pattern in each of the above.

In addition, it should be noted that in this embodiment, step 501 is optional, that is, in this embodiment, the TDM pattern is not limited to be transmitted through the above RRC signaling, MAC CE, or PDCCH. The above TDM pattern may also be transmitted through a user dedicated signaling.

Optionally, the TDM pattern is configured to indicate a ratio of the uplink resource and the downlink resource; or, the TMD pattern is configured to indicate a position of the uplink resource and/or the downlink resource within one period.

In this embodiment, the above-mentioned TDM pattern may be configured similar to the uplink and downlink slots allocation ratio of Time Division Duplexing (TDD), for example, the ratio of the downlink and uplink slots is 3:1.

In addition, the configuration mode similar to the Multicast Broadcast Single Frequency Network (MBSFN) may also be used to configure the above TDM pattern, for example, several slots are set as available uplink slots or available downlink slots every 40 ms period.

In this embodiment, the flexibility of the TDM pattern configuration may be improved through the above two methods.

Step 502: performing a transmission control according to the TDM pattern.

Optionally, the performing the transmission control according to the TDM pattern includes:

in the case that the UE receives Downlink Control Information (DCI) of an uplink (UL) grant and an uplink resource indicated by the DCI conflicts with the uplink resource indicated by the TDM pattern, cancelling performing a scheduling result of the UL grant;

and/or in the case that the UE receives DCI of a downlink (DL) grant and a downlink resource indicated by the DCI conflicts with the downlink resource indicated by the TDM pattern, cancelling performing a scheduling result of the DL grant;

and/or in the case that an uplink resource scheduled by a UL grant transmitted on a target downlink resource conflicts with the uplink resource indicated by the TDM pattern, cancelling a blind detection for the UL grant on the target downlink resource;

and/or in the case that a downlink resource scheduled by a DL grant transmitted on the target downlink resource conflicts with the downlink resource indicated by the TDM pattern, cancelling a blind detection for the DL grant on the target downlink resource.

The DCI of the UL grant and the DL grant are sent by the base station. In addition, the uplink resource conflicting with the uplink resource indicated by the TDM pattern includes:

the uplink resource is not within the uplink resource available for the UE which is indicated by the TDM pattern;

the downlink resource conflicting with the downlink resource indicated by the TDM pattern includes:

the downlink resource is not within the downlink resource available for the UE which is indicated by the TDM pattern.

For example, the uplink slot or uplink subframe indicated by the DCI of the UL grant is not in the uplink slot or uplink subframe available for the UE indicated by the TDM pattern; or The downlink slot or downlink subframe indicated by the DCI of the DL grant is not in the downlink slot or downlink subframe available for the UE indicated by the TDM pattern.

In this embodiment, the scheduling result of the DL grant or UL grant that conflicts with the above TDM pattern may not be executed, and the DL grant or UL grant is considered to be a false report, so that the intra-UE interference may be avoided.

For example, for the harmonic interference, the LTE base station provides a UL TDM pattern (such as [10101010]) to the above-mentioned UE served by the LTE base station, where [10101010] represents that the UE receiving the signaling may only perform a transmission at Slot 0, 2, 4 and 6. The NR base station may send the DL TDM pattern (such as [01010101]) to the above-mentioned UE served by the NR base station, where [01010101] represents that the UE receiving the signaling may only perform a reception at Slot 1, 3, 5 and 7.

In this way, the CRC check of the PDCCH sent by the LTE base station received by the UE is successfully, but the UL slot indicated by the DCI of the UL grant transmitted by the PDCCH conflicts with the TDM pattern. For example, the UE receives DCI of the UL grant indicating that the UE performs a transmission at Slot 1, 3, 5 and 7, that conflicts with the TDM pattern indicating that the UE may only perform a transmission at the Slot 0, 2, 4 and 6, so the UE skips this UL grant.

If the CRC check of the PDCCH sent by the NR base station received by the UE is successfully, but the DCI of the DL grant transmitted by the PDCCH indicates that the UE performs a reception at Slot 0, 2, 4 and 6, that conflicts with the TDM pattern indicating that the UE may only perform a reception at Slot 1, 3, 5 and 7, so the UE skips this DL grant.

For another example, for the intermodulation interference, the LTE base station provides a UL TDM pattern (such as [11110000]) to the UE served by the LTE base station, where [11110000] indicates that the UE receiving the signaling may only perform a transmission at Slot 0, 1, 2 and 3.

The NR base station sends the UL TDM pattern (such as [00001111]) to the UE served by the NR base station, where [00001111] represents that the UE receiving the signaling may only perform a transmission at Slot 4, 5, 6 and 7.

If the UE receives the UL grant sent by the LTE base station which indicates that the UE performs the transmission at Slot 4, 5, 6 and 7, that conflicts with the TDM pattern indicating that the UE may only perform a transmission at Slot 0, 1, 2 and 3, so the UE skips this UL grant.

If the UE receives the UL grant sent by the NR base station which indicates that the UE performs the transmission at Slot 0, 1, 2 and 3, that conflicts with the TDM pattern indicating that the UE may only perform a transmission at Slot 4, 5, 6 and 7, so the UE skips this UL grant.

In addition, in the above embodiments, the uplink resource scheduled by the UL grant transmitted on the target downlink resource conflicts with the uplink resource indicated by the TDM pattern, which may refer to that the UE predicts that the uplink resource scheduled by the UL grant transmitted on the above target downlink resource conflicts with the uplink resource indicated by the TDM pattern. For example, the UE may predict, based on a default UL grant uplink slot or downlink slot scheduling rule, whether the uplink resource scheduled by the UL grant transmitted on the downlink resource conflicts with the uplink resource indicated by the TDM pattern. If so, the blind detection of the UL grant may not be performed on the target downlink resource, thereby saving the power consumption of the UE and avoiding the intra-UE interference.

For the case that the downlink resource scheduled by the DL grant transmitted on the target downlink resource conflicts with the downlink resource indicated by the TDM pattern, reference may be made to the case that the downlink resource scheduled by the UL grant transmitted on the target downlink resource conflicts with the downlink resource indicated by the TDM pattern, which is not repeated herein. In addition, in this embodiment, the search space for the blind detection of UL grant or DL grant on a certain slot is independent, for example, resources of the search space are orthogonal or partially overlap.

For example, for the harmonic interference, it is assumed that the blind detection areas of UL grant or DL grant on some slots are independent, and the UL slots or DL slots scheduled by the UL grants or DL grants transmitted on these DL slots conflict with the TDM pattern, then the UE does not perform a blind detection on the UL grants or DL grants on these DL slots, that is, in these DL slots, the UE skips the blind detections of the UL grants or DL grants.

For another example, for the intermodulation interference, it is assumed that the blind detection areas of UL grants or DL grants on some slots are independent, and the UL slots scheduled by the UL grants transmitted on these DL slots conflict with the TDM pattern, then the UE does not perform a blind detection on the UL grants on these DL slots, that is, in these DL slots, the UE skips the blind detections of the UL grants.

Optionally, subsequent to receiving the TDM pattern sent by the base station, the method further includes:

turning off a radio frequency module circuit and/or a baseband module circuit of a transmitter according to the TDM pattern, where the radio frequency module circuit is all or a part of the radio frequency module circuit of the transmitter;

and/or turning off a radio frequency module circuit and/or a baseband module circuit of a receiver according to the TDM pattern, where the radio frequency module circuit is all or a part of the radio frequency module circuit of the receiver.

The radio frequency module circuit of the turned-off transmitter may be one or more of a power amplifier (PA) and a filter. The RF module circuit of the turned-off receiver may be one or more of a low noise amplifier (LNA) and a filter.

It may be determined which slots do not need to be transmitted according to the above TDM pattern, and then the RF module circuit and/or the baseband module circuit of the transmitter are turned off at the corresponding slot, thereby saving the power consumption of the UE. Similarly, the RF module circuit and/or the baseband module circuit of the receiver may be turned off, so as to further save the power consumption of the UE.

Of course, subsequent to the turning off the radio frequency module circuit and/or the baseband module circuit of the transmitter according to the TDM pattern, the method further includes:

starting in advance the radio frequency module circuit and/or the baseband module circuit of the transmitter according to the TDM pattern and a preset time, where the preset time is a warm-up time of the radio frequency module circuit and/or the baseband module circuit of the transmitter, and the radio frequency module circuit is all or a part of the radio frequency module circuit of the transmitter;

subsequent to the turning off the radio frequency module circuit and/or the baseband module circuit of the receiver according to the TDM pattern, the method further includes:

starting in advance the radio frequency module circuit and/or the baseband module circuit of the receiver according to the TDM pattern and a preset time, where the preset time is a warm-up time of the radio frequency module circuit and/or the baseband module circuit of the receiver, and the radio frequency module circuit is all or a part of the radio frequency module circuit of the receiver.

For example: the warm-up time of the RF module circuit and/or the baseband module circuit of the transmitter is 5 um, then the RF module and/or the baseband module circuit is turned on at least 5 um before the uplink transmission slot. For another example: the warm-up time of the RF module circuit and/or the baseband module circuit of the receiver is 5 um, then the RF module and/or the baseband module circuit is turned on at least 5 um before the downlink receiving slot.

The above warm-up time may be understood as the period from turning on the transmitter or receiver's radio frequency module circuit and/or baseband module circuit starts to the time when they can work normally. Through the above TDM pattern and preset time, it is able to save the power consumption of the UE, ensure that the UE may accurately receive and send data, so as to improve the performance of the UE.

In addition, in this embodiment, the above method may further include the following steps:

receiving a TDM pattern sent by a second base station, where the TDM pattern is configured to indicate an uplink resource and/or a downlink resource available for the UE, and the second base station is a serving base station of the UE; and performing a transmission control according to the TDM pattern sent by the second base station.

For the performing the transmission control according to the TDM pattern sent by the second base station, reference may be made to the above embodiment of the performing the transmission control according to the TDM pattern sent by the base station, which is not described herein and may achieve the same effects.

Figure 3:
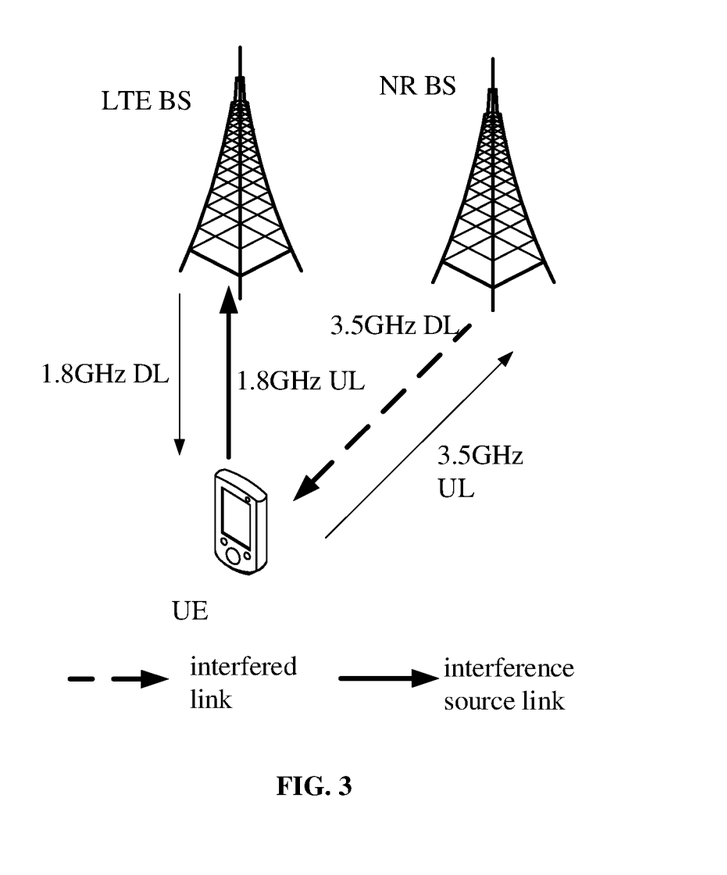
FIG. 3 is a schematic transmission diagram in an embodiment of the present disclosure.
Figure 4:
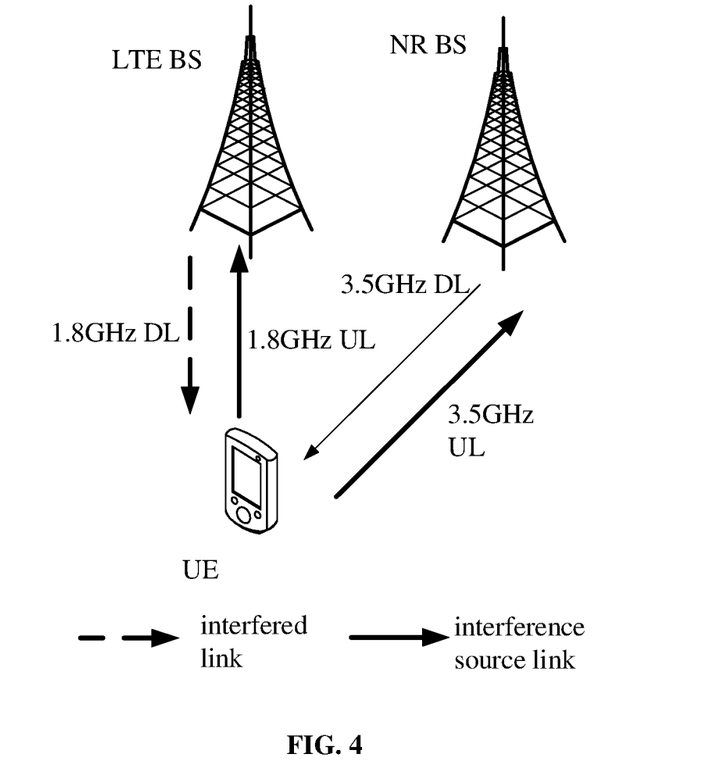
FIG. 4 is another schematic transmission diagram in an embodiment of the present disclosure.
Figure 6:
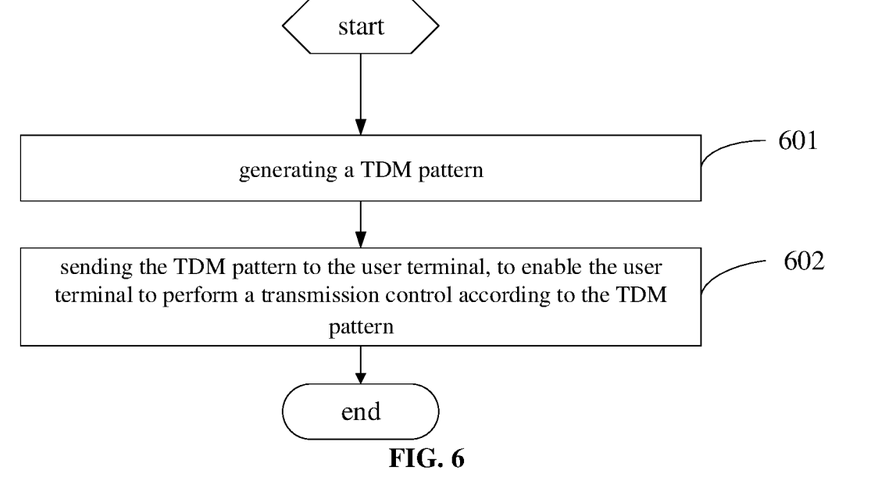
FIG. 6 is a flowchart of another transmission control method in an embodiment of the present disclosure.

Referring to FIG. 6, which is a flowchart of a transmission control method in an embodiment of the present disclosure. The method is applied to a base station. As shown in FIG. 6, the method includes the following steps:

Step 601: generating a TDM pattern, where the TDM pattern is configured to indicate an uplink resource and/or a downlink resource available for the UE;

For the above TDM pattern, reference may be made to the corresponding descriptions of the embodiments shown in FIG. 2 and FIG. 3, and details are not described herein.

Step 602: sending the TDM pattern to the UE, to enable the UE to perform a transmission control according to the TDM pattern.

According to the embodiment of the present disclosure, by generating a TDM pattern and sending the TDM pattern to a UE for the UE to perform a transmission control according to the TDM pattern, the transmission performance of the UE may be improved.

Figure 7:
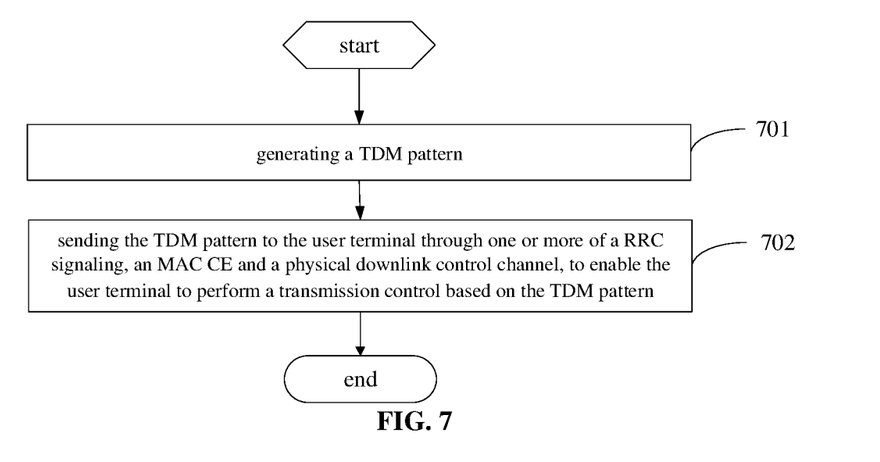
FIG. 7 is a flowchart of another transmission control method in an embodiment of the present disclosure.

Referring to FIG. 7, which is a flowchart of a transmission control method in an embodiment of the present disclosure. The method is applied to a base station. As shown in FIG. 7, the method includes the following steps:

Step 701: generating a TDM pattern, where the TDM pattern is configured to indicate an uplink resource and/or a downlink resource available for the UE;

Step 702: sending the TDM pattern to the UE through one or more of a Radio Resource Control (RRC) signaling, a Media Access Control (MAC) Control Unit (CE) and a physical downlink control channel, to enable the UE to perform a transmission control based on the TDM pattern.

Optionally, the uplink resource includes an uplink slot or an uplink Physical Resource Block (PRB), and the downlink resource includes a downlink slot or a downlink PRB.

Optionally, the sending the TDM pattern to the UE includes:

sending the TDM pattern to the UE through one or more of a Radio Resource Control (RRC) signaling, a Media Access Control (MAC) Control Unit (CE) and a physical downlink control channel.

Optionally, the TDM pattern is configured to indicate a ratio of the uplink resource and the downlink resource; or the TMD pattern is configured to indicate a position of the uplink resource and/or the downlink resource within one period.

Optionally, the TDM pattern is configured to enable the UE to cancel performing a scheduling result of an uplink (UL) grant, where the cancelling performing the scheduling result of the UL grant includes: in the case that the UE receives Downlink Control Information (DCI) of the UL grant and an uplink resource indicated by the DCI conflicts with the uplink resource indicated by the TDM pattern, cancelling performing the scheduling result of the UL grant;

and/or the TDM pattern is configured to enable the UE to cancel performing a scheduling result of a downlink (DL) grant, where the cancelling performing the scheduling result of the DL grant includes: in the case that the UE receives Downlink Control Information (DCI) of the DL grant and a downlink resource indicated by the DCI conflicts with the downlink resource indicated by the TDM pattern, cancelling performing the scheduling result of the DL grant;

and/or the TDM pattern is configured to enable the UE to cancel a blind detection for the UL grant, where the cancelling the blind detection for the UL grant includes: in the case that an uplink resource scheduled by the UL grant transmitted on a target downlink resource conflicts with the uplink resource indicated by the TDM pattern, cancelling the blind detection for the UL grant on the target downlink resource;

and/or the TDM pattern is configured to enable the UE to cancel a blind detection for the DL grant, where the cancelling the blind detection for the DL grant includes: in the case that a downlink resource scheduled by the DL grant transmitted on a target downlink resource conflicts with the downlink resource indicated by the TDM pattern, cancelling the blind detection for the DL grant on the target downlink resource.

Optionally, the uplink resource conflicting with the uplink resource indicated by the TDM pattern includes:

the uplink resource is not within the uplink resource available for the UE which is indicated by the TDM pattern;

the downlink resource conflicting with the downlink resource indicated by the TDM pattern includes:

the downlink resource is not within the downlink resource available for the UE which is indicated by the TDM pattern.

Optionally, the TDM pattern is further configured to enable the UE to turn off a radio frequency module circuit and/or a baseband module circuit of a transmitter according to the TDM pattern, where the radio frequency module circuit is all or a part of the radio frequency module circuit of the transmitter;

and/or the TDM pattern is further configured to enable the UE to turn off a radio frequency module circuit and/or a baseband module circuit of a receiver according to the TDM pattern, where the radio frequency module circuit is all or a part of the radio frequency module circuit of the receiver.

Optionally, the TDM pattern is further configured to enable the UE to start in advance the radio frequency module circuit and/or the baseband module circuit of the transmitter according to the TDM pattern and a preset time, where the preset time is a warm-up time of the radio frequency module circuit and/or the baseband module circuit of the transmitter, and the radio frequency module circuit is all or a part of the radio frequency module circuit of the transmitter;

the TDM pattern is further configured to enable the UE to start in advance the radio frequency module circuit and/or the baseband module circuit of the receiver according to the TDM pattern and a preset time, where the preset time is a warm-up time of the radio frequency module circuit and/or the baseband module circuit of the receiver, and the radio frequency module circuit is all or a part of the radio frequency module circuit of the receiver.

It should be noted that this embodiment is an implementation manner of the base station corresponding to the embodiment shown in FIG. 5. For the implementation manners thereof, reference may be made to the description of the embodiment shown in FIG. 5, which may achieve the same effects, so the detailed thereof is omitted herein in order to avoid repetition.

Figure 8:
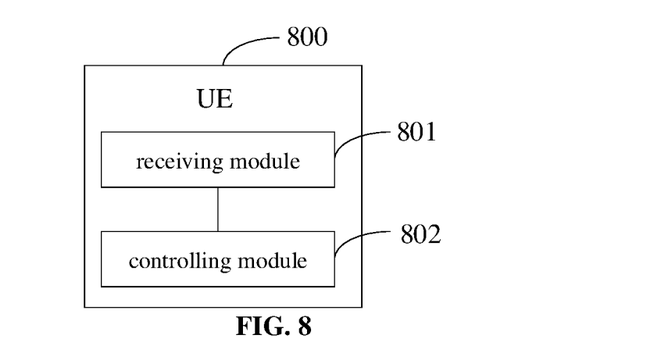
FIG. 8 is a structural diagram of a UE in an embodiment of the present disclosure.

Referring to FIG. 8 which is a structural diagram of a UE applied in an embodiment of the present disclosure. As shown in FIG. 8, the UE 800 includes:

a receiving module 801, configured to receive a Time Division Multiplexing (TDM) pattern sent by a base station, where the TDM pattern is configured to indicate an uplink resource and/or a downlink resource available for the UE, and the base station is a serving base station of the UE; and a controlling module 802, configured to perform a transmission control according to the TDM pattern.

Optionally, the uplink resource includes an uplink slot or an uplink Physical Resource Block (PRB), and the downlink resource includes a downlink slot or a downlink PRB.

Optionally, the receiving module 801 is further configured to receive the TDM pattern which is sent by the base station through one or more of a Radio Resource Control (RRC) signaling, a Media Access Control (MAC) Control Unit (CE) and a physical downlink control channel.

Optionally, the TDM pattern is configured to indicate a ratio of the uplink resource and the downlink resource; or the TMD pattern is configured to indicate a position of the uplink resource and/or the downlink resource within one period.

Optionally, the controlling module 802 is further configured to: in the case that the UE receives Downlink Control Information (DCI) of an uplink (UL) grant and an uplink resource indicated by the DCI conflicts with the uplink resource indicated by the TDM pattern, cancel performing a scheduling result of the UL grant;

and/or the controlling module 802 is further configured to: in the case that the UE receives DCI of a downlink (DL) grant and a downlink resource indicated by the DCI conflicts with the downlink resource indicated by the TDM pattern, cancel performing a scheduling result of the DL grant;

and/or the controlling module 802 is further configured to: in the case that an uplink resource scheduled by a UL grant transmitted on a target downlink resource conflicts with the uplink resource indicated by the TDM pattern, cancel a blind detection for the UL grant on the target downlink resource;

and/or the controlling module 802 is further configured to: in the case that a downlink resource scheduled by a DL grant transmitted on the target downlink resource conflicts with the downlink resource indicated by the TDM pattern, cancel a blind detection for the DL grant on the target downlink resource.

Optionally, the uplink resource conflicting with the uplink resource indicated by the TDM pattern includes:

the uplink resource is not within the uplink resource available for the UE which is indicated by the TDM pattern;

the downlink resource conflicting with the downlink resource indicated by the TDM pattern includes:

the downlink resource is not within the downlink resource available for the UE which is indicated by the TDM pattern.

Figure 9:
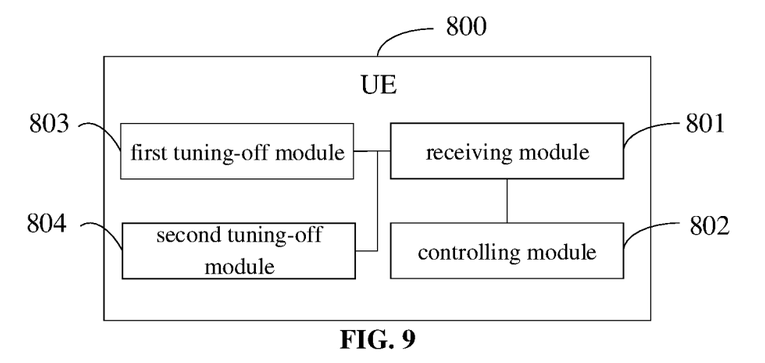
FIG. 9 is a structural diagram of another UE in an embodiment of the present disclosure.

Optionally, the UE 800 further includes:

a first tuning-off module 803, configured to turn off a radio frequency module circuit and/or a baseband module circuit of a transmitter according to the TDM pattern, where the radio frequency module circuit is all or a part of the radio frequency module circuit of the transmitter; and/or a second tuning-off module 804, configured to turn off a radio frequency module circuit and/or a baseband module circuit of a receiver according to the TDM pattern, where the radio frequency module circuit is all or a part of the radio frequency module circuit of the receiver.

Figure 10:
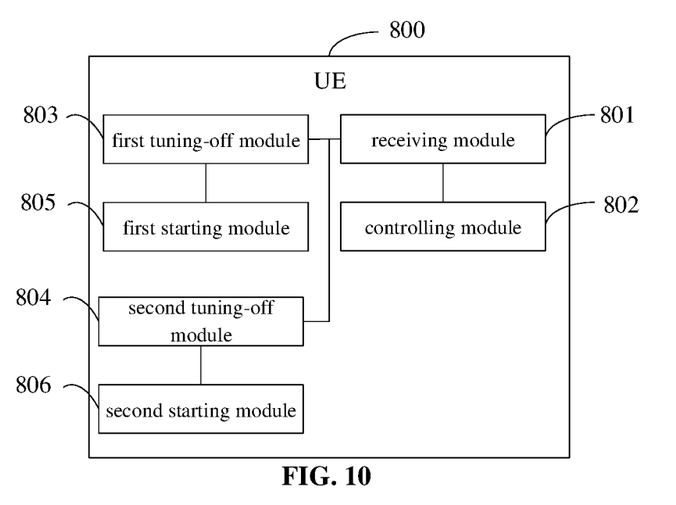
FIG. 10 is a structural diagram of another UE in an embodiment of the present disclosure.

Optionally, the UE further includes:

a first starting module 805, configured to start in advance the radio frequency module circuit and/or the baseband module circuit of the transmitter according to the TDM pattern and a preset time, where the preset time is a warm-up time of the radio frequency module circuit and/or the baseband module circuit of the transmitter, and the radio frequency module circuit is all or a part of the radio frequency module circuit of the transmitter;

a second starting module 806, configured to start in advance the radio frequency module circuit and/or the baseband module circuit of the receiver according to the TDM pattern and a preset time, where the preset time is a warm-up time of the radio frequency module circuit and/or the baseband module circuit of the receiver, and the radio frequency module circuit is all or a part of the radio frequency module circuit of the receiver.

It should be noted that the above-mentioned UE 800 in this embodiment may be a UE in any of the method embodiments in the embodiments of the present disclosure, and any implementation of the UE in the method embodiments in the embodiments of the present disclosure may be used by the present disclosure. The same is achieved by the UE 800 in the embodiment and achieves the same beneficial effects, and details are not described herein again.

Figure 11:
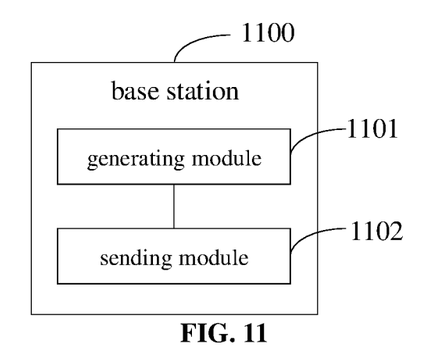
FIG. 11 is a structural diagram of a base station in an embodiment of the present disclosure.

Refer to FIG. 11 which is a structural diagram of a base station to which an embodiment of the present disclosure is applied. As shown in FIG. 11, the base station 1100 includes:

a generating module 1101, configured to generate a Time Division Multiplexing (TDM) pattern, where the TDM pattern is configured to indicate an uplink resource and/or a downlink resource available for the UE; and a sending module 1102, configured to send the TDM pattern to the UE, to enable the UE to perform a transmission control according to the TDM pattern.

Optionally, the uplink resource includes an uplink slot or an uplink Physical Resource Block (PRB), and the downlink resource includes a downlink slot or a downlink PRB.

Optionally, the sending module 1102 is further configured to send the TDM pattern to the UE through one or more of a Radio Resource Control (RRC) signaling, a Media Access Control (MAC) Control Unit (CE) and a physical downlink control channel.

Optionally, the TDM pattern is configured to indicate a ratio of the uplink resource and the downlink resource; or the TMD pattern is configured to indicate a position of the uplink resource and/or the downlink resource within one period.

Optionally, the TDM pattern is configured to enable the UE to cancel performing a scheduling result of an uplink (UL) grant, where the cancelling performing the scheduling result of the UL grant includes: in the case that the UE receives Downlink Control Information (DCI) of the UL grant and an uplink resource indicated by the DCI conflicts with the uplink resource indicated by the TDM pattern, cancelling performing the scheduling result of the UL grant;

and/or the TDM pattern is configured to enable the UE to cancel performing a scheduling result of a downlink (DL) grant, where the cancelling performing the scheduling result of the DL grant includes: in the case that the UE receives Downlink Control Information (DCI) of the DL grant and a downlink resource indicated by the DCI conflicts with the downlink resource indicated by the TDM pattern, cancelling performing the scheduling result of the DL grant;

and/or the TDM pattern is configured to enable the UE to cancel a blind detection for the UL grant, where the cancelling the blind detection for the UL grant includes: in the case that an uplink resource scheduled by the UL grant transmitted on a target downlink resource conflicts with the uplink resource indicated by the TDM pattern, cancelling the blind detection for the UL grant on the target downlink resource;

and/or the TDM pattern is configured to enable the UE to cancel a blind detection for the DL grant, where the cancelling the blind detection for the DL grant includes: in the case that a downlink resource scheduled by the DL grant transmitted on a target downlink resource conflicts with the downlink resource indicated by the TDM pattern, cancelling the blind detection for the DL grant on the target downlink resource.

Optionally, the uplink resource conflicting with the uplink resource indicated by the TDM pattern includes:

the uplink resource is not within the uplink resource available for the UE which is indicated by the TDM pattern;

the downlink resource conflicting with the downlink resource indicated by the TDM pattern includes:

the downlink resource is not within the downlink resource available for the UE which is indicated by the TDM pattern.

Optionally, the TDM pattern is further configured to enable the UE to turn off a radio frequency module circuit and/or a baseband module circuit of a transmitter according to the TDM pattern, where the radio frequency module circuit is all or a part of the radio frequency module circuit of the transmitter;

and/or the TDM pattern is further configured to enable the UE to turn off a radio frequency module circuit and/or a baseband module circuit of a receiver according to the TDM pattern, where the radio frequency module circuit is all or a part of the radio frequency module circuit of the receiver.

Optionally, the TDM pattern is further configured to enable the UE to start in advance the radio frequency module circuit and/or the baseband module circuit of the transmitter according to the TDM pattern and a preset time, where the preset time is a warm-up time of the radio frequency module circuit and/or the baseband module circuit of the transmitter, and the radio frequency module circuit is all or a part of the radio frequency module circuit of the transmitter;

the TDM pattern is further configured to enable the UE to start in advance the radio frequency module circuit and/or the baseband module circuit of the receiver according to the TDM pattern and a preset time, where the preset time is a warm-up time of the radio frequency module circuit and/or the baseband module circuit of the receiver, and the radio frequency module circuit is all or a part of the radio frequency module circuit of the receiver.

It should be noted that the above-mentioned base station 1100 in this embodiment may be a base station of any implementation manner in the method embodiment in the embodiment of the present disclosure, and any implementation manner of the base station in the method embodiment in this embodiment of the present disclosure may be used in this embodiment. The above-mentioned base station 1100 is implemented and achieves the same beneficial effects, which will not be repeated here.

Figure 12:
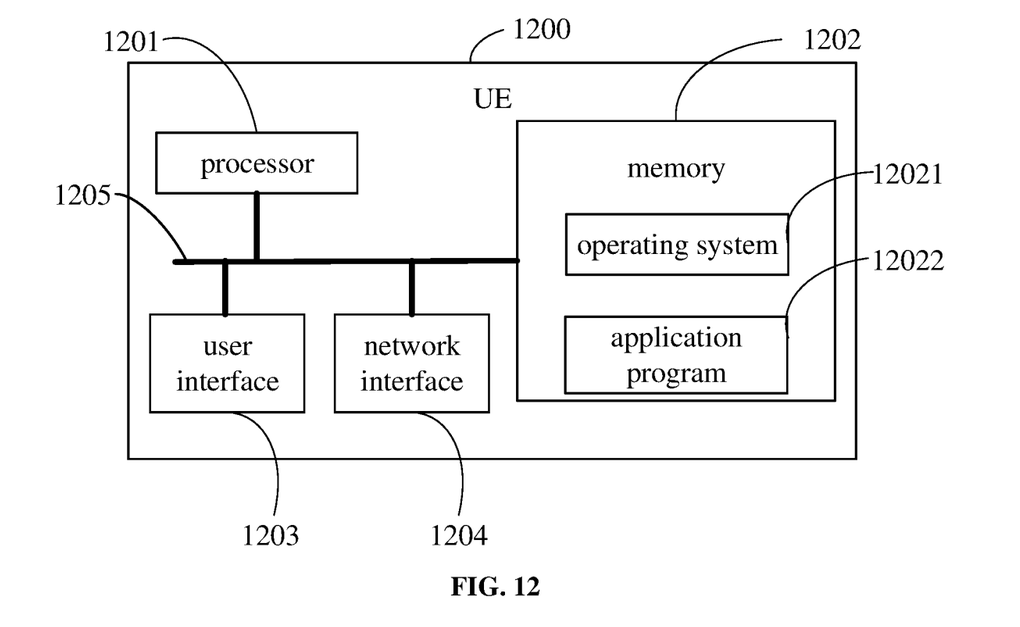
FIG. 12 is a structural diagram of another UE in an embodiment of the present disclosure.

Referring to FIG. 12 which is a structural diagram of another UE in an embodiment of the present disclosure. As shown in FIG. 12, the UE 1200 includes: at least one processor 1201, a memory 1202, at least one network interface 1204, and a user interface 1203. The various components in the UE 1200 are coupled together through a bus system 1205. It can be understood that the bus system 1205 is configured to implement connection and communication between these components. The bus system 1205 includes a power bus, a control bus, and a status signal bus in addition to the data bus. However, for the sake of clarity, various buses are marked as the bus system 1205 in FIG. 12.

The user interface 1203 may include a display, a keyboard, or a pointing device (for example, a mouse, a track ball, a touch panel, or a touch screen).

It can be understood that the memory 1202 in the embodiment of the present disclosure may be a volatile memory or a non-volatile memory, or may include both volatile and non-volatile memories. Among them, the non-volatile memory may be a read-only memory (ROM), a programmable read-only memory (PROM), an erasable programmable read-only memory (EROM), and an electronic memory. Erase programmable EPROM (EEPROM) or flash memory. The volatile memory may be a Random Access Memory (RAM), which is used as an external cache. By way of example, but not limitation, many forms of RAM are available, such as Static Random Access Memory (SRAM), Dynamic Random Access Memory (DRAM), Synchronous Dynamic Random Access Memory (Synchronous DRAM, SDRAM), double data rate synchronous dynamic random access memory (Double Data Rate SDRAM, DDRSDRAM), enhanced synchronous dynamic random access memory (Enhanced SDRAM, ESDRAM), synchronous connection dynamic random access memory (Synch Link DRAM, SLDRAM) And direct memory bus random access memory (Direct Rambus RAM, DRRAM). The memory 1202 of the systems and methods described herein is intended to include, but is not limited to, these and any other suitable types of memory.

In some implementations, the memory 1202 stores the following elements, executable modules or data structures, or a subset of them, or their extended set: an operating system 12021 and an application program 12022.

Among them, the operating system 12021 includes various system programs, such as a framework layer, a core library layer, and a driver layer, etc., for implementing various basic services and processing hardware-based tasks. The application program 12022 includes various application programs, such as a media player (Media Player), a browser (Browser), and the like, and is configured to implement various application services. A program for implementing the method of the embodiment of the present disclosure may be included in the application program 12022.

In the embodiment of the present disclosure, the UE 1200 further includes a transmission control program stored in the memory 1202 and executable on the processor 1201. Specifically, the UE 1200 may be a transmission control program stored in the application program 12022, and the transmission control program is executed by the processor 1201 to perform:

receiving a TDM pattern sent by a base station, where the TDM pattern is configured to indicate an uplink resource and/or a downlink resource available for the UE, and the base station is a serving base station of the UE; and performing a transmission control according to the TDM pattern.

The method disclosed in the above embodiment of the present disclosure may be applied to the processor 1201, or implemented by the processor 1201. The processor 1201 may be an integrated circuit chip and has a signal processing capability. In the implementation process, each step of the above method may be completed by an integrated logic circuit of hardware in the processor 1201 or an instruction in the form of software. The processor 1201 may be a general-purpose processor, a digital signal processor (DSP), an application if integrated circuit (ASIC), a ready-made programmable gate array (Field Programmable Gate Array, FPGA), or other Programming logic devices, discrete gate or transistor logic devices, discrete hardware components. Various methods, steps, and logical block diagrams disclosed in the embodiments of the present disclosure may be implemented or executed. A general-purpose processor may be a microprocessor or the processor may be any conventional processor or the like. The steps of the method disclosed in combination with the embodiments of the present disclosure may be directly implemented by a hardware decoding processor, or may be performed by using a combination of hardware and software modules in the decoding processor. The software module may be located in a mature storage medium such as a random access memory, a flash memory, a read-only memory, a programmable read-only memory, or an electrically erasable programmable memory, a register, and the like. The storage medium is located in the memory 1202, and the processor 1201 reads the information in the memory 1202 and completes the steps of the above method in combination with its hardware.

It can be understood that the embodiments described herein may be implemented by hardware, software, firmware, middleware, microcode, or a combination thereof. For hardware implementation, the processing unit can be implemented in one or more Application Specific Integrated Circuits (ASIC), Digital Signal Processing (DSP), Digital Signal Processing Equipment (DSPD), and programmable logic. Device (Programmable Logic Device, PLD), Field Programmable Gate Array (FPGA), general-purpose processor, controller, microcontroller, microprocessor, and other electronic units for performing the functions described in this application or a combination thereof.

For software implementation, the techniques described herein can be implemented through modules (e.g., procedures, functions, etc.) that perform the functions described herein. Software codes may be stored in a memory and executed by a processor. The memory may be implemented in the processor or external to the processor.

Optionally, the uplink resource includes an uplink slot or an uplink PRB, and the downlink resource includes a downlink slot or a downlink PRB.

Optionally, the receiving the TDM pattern sent by the base station performed by the processor 1201 includes:

receiving the TDM pattern which is sent by the base station through one or more of a Radio Resource Control (RRC) signaling, a Media Access Control (MAC) Control Unit (CE) and a physical downlink control channel.

Optionally, the TDM pattern is configured to indicate a ratio of the uplink resource and the downlink resource; or the TMD pattern is configured to indicate a position of the uplink resource and/or the downlink resource within one period.

Optionally, the performing the transmission control according to the TDM pattern performed by the processor 1201 includes:

in the case that the UE receives Downlink Control Information (DCI) of an uplink (UL) grant and an uplink resource indicated by the DCI conflicts with the uplink resource indicated by the TDM pattern, cancelling performing a scheduling result of the UL grant;

and/or in the case that the UE receives DCI of a downlink (DL) grant and a downlink resource indicated by the DCI conflicts with the downlink resource indicated by the TDM pattern, cancelling performing a scheduling result of the DL grant;

and/or in the case that an uplink resource scheduled by a UL grant transmitted on a target downlink resource conflicts with the uplink resource indicated by the TDM pattern, cancelling a blind detection for the UL grant on the target downlink resource;

and/or in the case that a downlink resource scheduled by a DL grant transmitted on the target downlink resource conflicts with the downlink resource indicated by the TDM pattern, cancelling a blind detection for the DL grant on the target downlink resource.

Optionally, the uplink resource conflicting with the uplink resource indicated by the TDM pattern includes:

the uplink resource is not within the uplink resource available for the UE which is indicated by the TDM pattern;

the downlink resource conflicting with the downlink resource indicated by the TDM pattern includes:

the downlink resource is not within the downlink resource available for the UE which is indicated by the TDM pattern.

Optionally, subsequent to receiving the TDM pattern sent by the base station, the transmission control program is executed by the processor 1201 to perform:

turning off a radio frequency module circuit and/or a baseband module circuit of a transmitter according to the TDM pattern, where the radio frequency module circuit is all or a part of the radio frequency module circuit of the transmitter;

and/or turning off a radio frequency module circuit and/or a baseband module circuit of a receiver according to the TDM pattern, where the radio frequency module circuit is all or a part of the radio frequency module circuit of the receiver.

Optionally, subsequent to the turning off the radio frequency module circuit and/or the baseband module circuit of the transmitter according to the TDM pattern, the transmission control program is executed by the processor 1201 to perform:

starting in advance the radio frequency module circuit and/or the baseband module circuit of the transmitter according to the TDM pattern and a preset time, where the preset time is a warm-up time of the radio frequency module circuit and/or the baseband module circuit of the transmitter, and the radio frequency module circuit is all or a part of the radio frequency module circuit of the transmitter;

subsequent to the turning off the radio frequency module circuit and/or the baseband module circuit of the receiver according to the TDM pattern, the transmission control program is executed by the processor 1201 to perform:

starting in advance the radio frequency module circuit and/or the baseband module circuit of the receiver according to the TDM pattern and a preset time, where the preset time is a warm-up time of the radio frequency module circuit and/or the baseband module circuit of the receiver, and the radio frequency module circuit is all or a part of the radio frequency module circuit of the receiver.

It should be noted that the UE 1200 in this embodiment may be a UE in any of the method embodiments in the embodiments of the present disclosure, and any embodiment of the UE in the method embodiments in the embodiments of the present disclosure may be used by the present disclosure. The same is achieved by the UE 1200 in the embodiment, and the same beneficial effects are achieved, and details are not described herein again.

Figure 13:
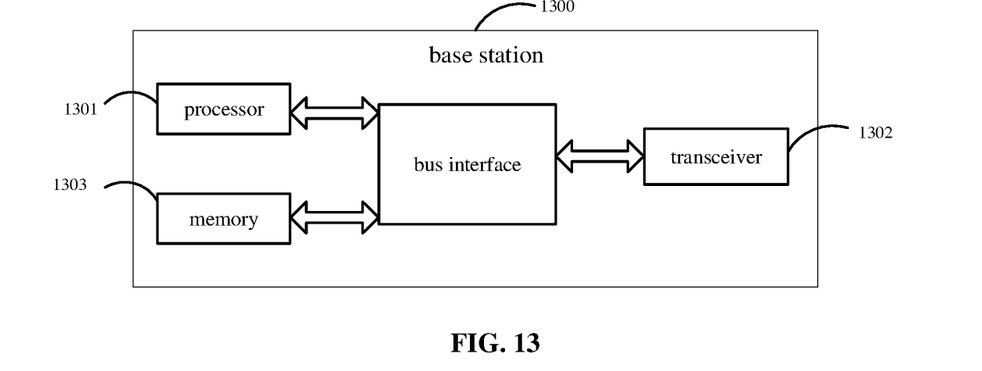
FIG. 13 is a structural diagram of another base station in an embodiment of the present disclosure.

Referring to FIG. 13 which is a structural diagram of another base station in an embodiment of the present disclosure. As shown in FIG. 13, the base station 1300 includes: a processor 1301, a transceiver 1302, a memory 1303 and a bus interface.

In the embodiment of the present disclosure, the base station 1300 further includes a transmission control program stored in the memory 1303 and executable on the processor 1301. The transmission control program is executed by the processor 1301 to perform:

generating a TDM pattern, where the TDM pattern is configured to indicate an uplink resource and/or a downlink resource available for the UE; and sending the TDM pattern to the UE, to enable the UE to perform a transmission control according to the TDM pattern.

The transceiver 1302 is configured to receive and send data under the control of the processor 1301. The transceiver 1302 includes at least two antenna ports.

In FIG. 13, the bus architecture may include any number of interconnected buses and bridges, and one or more processors represented by the processor 1301 and various circuits of the memory represented by the memory 1303 are linked together. The bus architecture can also link various other circuits such as peripherals, voltage regulators, and power management circuits, which are well known in the art, so they are not described further herein. The bus interface provides an interface. The transceiver 1302 may be a plurality of elements, including a transmitter and a receiver, providing a unit for communicating with various other devices on a transmission medium. For different user equipments, the user interface 1304 may also be an interface capable of externally connecting internally required devices. The connected devices include, but are not limited to, a keypad, a display, a speaker, a microphone, a joystick, and the like.

The processor 1301 is responsible for managing the bus architecture and general processing, and the memory 1303 may store data used by the processor 1301 in case of performing operations.

Optionally, the uplink resource includes an uplink slot or an uplink Physical Resource Block (PRB), and the downlink resource includes a downlink slot or a downlink PRB.

Optionally, the sending the TDM pattern to the UE executed by the processor 1301 includes:

sending the TDM pattern to the UE through one or more of a Radio Resource Control (RRC) signaling, a Media Access Control (MAC) Control Unit (CE) and a physical downlink control channel.

Optionally, the TDM pattern is configured to indicate a ratio of the uplink resource and the downlink resource; or the TMD pattern is configured to indicate a position of the uplink resource and/or the downlink resource within one period.

Optionally, the TDM pattern is configured to enable the UE to cancel performing a scheduling result of an uplink (UL) grant, where the cancelling performing the scheduling result of the UL grant includes: in the case that the UE receives Downlink Control Information (DCI) of the UL grant and an uplink resource indicated by the DCI conflicts with the uplink resource indicated by the TDM pattern, cancelling performing the scheduling result of the UL grant;

and/or the TDM pattern is configured to enable the UE to cancel performing a scheduling result of a downlink (DL) grant, where the cancelling performing the scheduling result of the DL grant includes: in the case that the UE receives Downlink Control Information (DCI) of the DL grant and a downlink resource indicated by the DCI conflicts with the downlink resource indicated by the TDM pattern, cancelling performing the scheduling result of the DL grant;

and/or the TDM pattern is configured to enable the UE to cancel a blind detection for the UL grant, where the cancelling the blind detection for the UL grant includes: in the case that an uplink resource scheduled by the UL grant transmitted on a target downlink resource conflicts with the uplink resource indicated by the TDM pattern, cancelling the blind detection for the UL grant on the target downlink resource;

and/or the TDM pattern is configured to enable the UE to cancel a blind detection for the DL grant, where the cancelling the blind detection for the DL grant includes: in the case that a downlink resource scheduled by the DL grant transmitted on a target downlink resource conflicts with the downlink resource indicated by the TDM pattern, cancelling the blind detection for the DL grant on the target downlink resource.

Optionally, the uplink resource conflicting with the uplink resource indicated by the TDM pattern includes:

the uplink resource is not within the uplink resource available for the UE which is indicated by the TDM pattern;

the downlink resource conflicting with the downlink resource indicated by the TDM pattern includes:

the downlink resource is not within the downlink resource available for the UE which is indicated by the TDM pattern.

Optionally, the TDM pattern is further configured to enable the UE to turn off a radio frequency module circuit and/or a baseband module circuit of a transmitter according to the TDM pattern, where the radio frequency module circuit is all or a part of the radio frequency module circuit of the transmitter;

and/or the TDM pattern is further configured to enable the UE to turn off a radio frequency module circuit and/or a baseband module circuit of a receiver according to the TDM pattern, where the radio frequency module circuit is all or a part of the radio frequency module circuit of the receiver.

Optionally, the TDM pattern is further configured to enable the UE to start in advance the radio frequency module circuit and/or the baseband module circuit of the transmitter according to the TDM pattern and a preset time, where the preset time is a warm-up time of the radio frequency module circuit and/or the baseband module circuit of the transmitter, and the radio frequency module circuit is all or a part of the radio frequency module circuit of the transmitter;

the TDM pattern is further configured to enable the UE to start in advance the radio frequency module circuit and/or the baseband module circuit of the receiver according to the TDM pattern and a preset time, where the preset time is a warm-up time of the radio frequency module circuit and/or the baseband module circuit of the receiver, and the radio frequency module circuit is all or a part of the radio frequency module circuit of the receiver.

It should be noted that the above-mentioned base station 1300 in this embodiment may be a configured base station in any of the method embodiments in the embodiments of the present disclosure, and any implementation of the configured base station in the method embodiments in the embodiments of the present disclosure may be implemented by the embodiment of the above-mentioned base station 1300, and the same effects are achieved, which is not repeated here.

A UE is provided in the embodiments of the present disclosure, including: a memory, a processor and a transmission control program stored in the memory and operable on the processor, where the transmission control program is executed by the processor to perform the transmission control method in the embodiments of the present disclosure.

A base station is provided in the embodiments of the present disclosure, including: a memory, a processor and a transmission control program stored in the memory and operable on the processor, where the transmission control program is executed by the processor to perform the transmission control method in the embodiments of the present disclosure.

A computer-readable storage medium storing a transmission control program is provided in the embodiments of the present disclosure, where the transmission control program is executed by a processor to perform the transmission control method in the embodiments of the present disclosure.

A computer-readable storage medium storing a transmission control program is provided in the embodiments of the present disclosure, where the transmission control program is executed by a processor to perform the transmission control method in the embodiments of the present disclosure.

Those of ordinary skill in the art may realize that the units and algorithm steps of each example described in connection with the embodiments disclosed herein can be implemented by electronic hardware, or a combination of computer software and electronic hardware. Whether these functions are performed in hardware or software depends on the application and design constraints of the technical solution. A person skilled in the art can use different methods to implement the described functions for each if application, but such implementation should not be considered to be beyond the scope of the present disclosure.

Those skilled in the art can clearly understand that, for the convenience and brevity of description, the working processes of the systems, devices, and units described above can refer to the corresponding processes in the above method embodiments, and are not repeated here.

In the embodiments provided in this application, it should be understood that the disclosed apparatus and method may be implemented in other ways. For example, the device embodiments described above are only schematic. For example, the division of the unit is only a logical function division. In actual implementation, there may be another division manner. For example, multiple units or components may be combined or can be integrated into another system, or some features can be ignored or not implemented. In addition, the displayed or discussed mutual coupling or direct coupling or communication connection may be indirect coupling or communication connection through some interfaces, devices or units, which may be electrical, mechanical or other forms.

The units described as separate components may or may not be physically separated, and the components displayed as units may or may not be physical units, may be located in one place, or may be distributed on multiple network units. Some or all of the units may be selected according to actual needs to achieve the objectives of the solutions of the embodiments of the present disclosure.

In addition, each functional unit in each embodiment of the present disclosure may be integrated into one processing unit, or each unit may exist separately physically, or two or more units may be integrated into one unit.

If the functions are implemented in the form of software functional units and sold or used as independent products, they can be stored in a computer-readable storage medium. Based on this understanding, the technical solution of the present disclosure is essentially a part that contributes to the existing technology or a part of the technical solution can be embodied in the form of a software product. The computer software product is stored in a storage medium, including Several instructions are configured to cause a computer device (which may be a personal computer, a server, or a network device, etc.) to perform all or part of the steps of the method described in various embodiments of the present disclosure. The above storage medium includes various media that can store program codes, such as a U disk, a mobile hard disk, a ROM, a RAM, a magnetic disk, or an optical disk.

The above are only some embodiments of the present disclosure, and it should be noted that those skilled in the art may also make several improvements and refinements without departing from the principles of the present disclosure, which should also fall within the scope of the present disclosure. Therefore, the scope of the present disclosure is the scope of the claim.

What is claimed is:

1. A transmission control method, applied to a User Equipment (UE), comprising:
    receiving a Time Division Multiplexing (TDM) pattern sent by a base station, wherein the TDM pattern is configured to indicate an uplink resource and/or a downlink resource available for the UE, and the base station is a serving base station of the UE;
    receiving Downlink Control Information (DCI) of an uplink (UL) grant; and
    cancelling performing a scheduling result of the UL grant when an uplink resource indicated by the DCI conflicts with the uplink resource indicated by the TDM pattern;
    wherein the uplink resource indicated by the DCI conflicting with the uplink resource indicated by the TDM pattern comprises: the uplink resource indicated by the DCI being within an uplink resource of another base station which is indicated by the TDM pattern.

2. The method according to claim 1, wherein the uplink resource comprises an uplink slot or an uplink Physical Resource Block (PRB), and the downlink resource comprises a downlink slot or a downlink PRB.

3. The method according to claim 1, wherein the receiving the TDM pattern sent by the base station comprises:
    receiving the TDM pattern which is sent by the base station through one or more of a Radio Resource Control (RRC) signaling, a Media Access Control (MAC) Control Unit (CE) and a physical downlink control channel.

4. The method according to claim 1, wherein the TDM pattern is configured to indicate a ratio of the uplink resource and the downlink resource; or
    the TDM pattern is configured to indicate a position of the uplink resource and/or the downlink resource within one period.

5. The method according to claim 1, further comprises:
    when the UE receives DCI of a downlink (DL) grant and a downlink resource indicated by the DCI conflicts with the downlink resource indicated by the TDM pattern, cancelling performing a scheduling result of the DL grant; and/or
    when an uplink resource scheduled by a UL grant transmitted on a target downlink resource conflicts with the uplink resource indicated by the TDM pattern, cancelling a blind detection for the UL grant on the target downlink resource; and/or
    when a downlink resource scheduled by a DL grant transmitted on the target downlink resource conflicts with the downlink resource indicated by the TDM pattern, cancelling a blind detection for the DL grant on the target downlink resource.

6. The method according to claim 5, wherein
the downlink resource conflicting with the downlink resource indicated by the TDM pattern comprises:
the downlink resource is not within the downlink resource available for the UE which is indicated by the TDM pattern.

7. The method according to claim 1, wherein subsequent to receiving the TDM pattern sent by the base station, the method further comprises:
turning off a radio frequency module circuit and/or a baseband module circuit of a transmitter according to the TDM pattern, wherein the radio frequency module circuit is all or a part of the radio frequency module circuit of the transmitter; and/or
turning off a radio frequency module circuit and/or a baseband module circuit of a receiver according to the TDM pattern, wherein the radio frequency module circuit is all or a part of the radio frequency module circuit of the receiver.

8. The method according to claim 7, wherein
subsequent to the turning off the radio frequency module circuit and/or the baseband module circuit of the transmitter according to the TDM pattern, the method further comprises:
starting in advance the radio frequency module circuit and/or the baseband module circuit of the transmitter according to the TDM pattern and a preset time, wherein the preset time is a warm-up time of the radio frequency module circuit and/or the baseband module circuit of the transmitter, and the radio frequency module circuit is all or a part of the radio frequency module circuit of the transmitter;
subsequent to the turning off the radio frequency module circuit and/or the baseband module circuit of the receiver according to the TDM pattern, the method further comprises:
starting in advance the radio frequency module circuit and/or the baseband module circuit of the receiver according to the TDM pattern and a preset time, wherein the preset time is a warm-up time of the radio frequency module circuit and/or the baseband module circuit of the receiver, and the radio frequency module circuit is all or a part of the radio frequency module circuit of the receiver.

9. A User Equipment (UE), comprising: a memory, a processor and a transmission control program stored in the memory and operable on the processor, wherein the transmission control program is executed by the processor to perform the transmission control method according to claim 1.

10. A transmission control method, applied to a base station, comprising:
generating a Time Division Multiplexing (TDM) pattern, wherein the TDM pattern is configured to indicate an uplink resource and/or a downlink resource available for a User Equipment (UE);
sending the TDM pattern to the UE, to enable the UE to perform a transmission control according to the TDM pattern;
sending Downlink Control Information (DCI) of an uplink (UL) grant; and cancelling receiving uplink (UL) information scheduled by the UL grant, when an uplink resource indicated by the DCI conflicts with the uplink resource indicated by the TDM pattern;
wherein the uplink resource indicated by the DCI conflicting with the uplink resource indicated by the TDM pattern comprises: the unlink resource indicated by the DCI being within an uplink resource of another base station which is indicated by the TDM pattern.

11. The method according to claim 10, wherein the uplink resource comprises an uplink slot or an uplink Physical Resource Block (PRB), and the downlink resource comprises a downlink slot or a downlink PRB.

12. The method according to claim 10, wherein the sending the TDM pattern to the UE comprises:
sending the TDM pattern to the UE through one or more of a Radio Resource Control (RRC) signaling, a Media Access Control (MAC) Control Unit (CE) and a physical downlink control channel.

13. The method according to claim 10, wherein the TDM pattern is configured to indicate a ratio of the uplink resource and the downlink resource; or
the TMD pattern is configured to indicate a position of the uplink resource and/or the downlink resource within one period.

14. The method according to claim 10, further comprises:
cancelling receiving downlink (DL) information scheduled by a DL grant, a downlink resource indicated by DCI of the DL grant conflicts with the downlink resource indicated by the TDM pattern, cancelling performing the scheduling result of the DL grant; and/or
cancelling sending the DCI of the UL grant on the target downlink resource, when an uplink resource scheduled by the UL grant transmitted on a target downlink resource conflicts with the uplink resource indicated by the TDM pattern; and/or
cancelling sending the DCI of the UL grant on the target downlink resource, when a downlink resource scheduled by the DL grant transmitted on a target downlink resource conflicts with the downlink resource indicated by the TDM pattern.

15. The method according to claim 14, wherein
the downlink resource conflicting with the downlink resource indicated by the TDM pattern comprises:
the downlink resource is not within the downlink resource available for the UE which is indicated by the TDM pattern.

16. The method according to claim 10, wherein
the TDM pattern is further configured to enable the UE to turn off a radio frequency module circuit and/or a baseband module circuit of a transmitter according to the TDM pattern, wherein the radio frequency module circuit is all or a part of the radio frequency module circuit of the transmitter;
and/or
the TDM pattern is further configured to enable the UE to turn off a radio frequency module circuit and/or a baseband module circuit of a receiver according to the TDM pattern, wherein the radio frequency module circuit is all or a part of the radio frequency module circuit of the receiver.

17. The method according to claim 16, wherein
the TDM pattern is further configured to enable the UE to start in advance the radio frequency module circuit and/or the baseband module circuit of the transmitter according to the TDM pattern and a preset time, wherein the preset time is a warm-up time of the radio frequency module circuit and/or the baseband module circuit of the transmitter, and the radio frequency module circuit is all or a part of the radio frequency module circuit of the transmitter;

the TDM pattern is further configured to enable the UE to start in advance the radio frequency module circuit and/or the baseband module circuit of the receiver according to the TDM pattern and a preset time, wherein the preset time is a warm-up time of the radio frequency module circuit and/or the baseband module circuit of the receiver, and the radio frequency module circuit is all or a part of the radio frequency module circuit of the receiver.

18. A base station, comprising: a memory, a processor and a transmission control program stored in the memory and operable on the processor, wherein the transmission control program is executed by the processor to perform the transmission control method according to claim 10.

19. A transmission control system, comprising a User Equipment (UE) and a base station; wherein the UE comprises: a memory, a processor and a transmission control program stored in the memory and operable on the processor, wherein the transmission control program is executed by the processor to perform:

receiving a Time Division Multiplexing (TDM) pattern sent by a base station, wherein the TDM pattern is configured to indicate an uplink resource and/or a downlink resource available for the UE, and the base station is a serving base station of the UE;

receiving Downlink Control Information (DCI) of an uplink (UL) grant; and cancelling performing a scheduling result of the UL grant when an uplink resource indicated by the DCI conflicts with the uplink resource indicated by the TDM pattern;

wherein the uplink resource indicated by the DCI conflicting with the uplink resource indicated by the TDM pattern comprises: the uplink resource indicated by the DCI being within an uplink resource of another base station which is indicated by the TDM pattern;

the base station comprises: a memory, a processor and a transmission control program stored in the memory and operable on the processor, wherein the transmission control program is executed by the processor to perform:

generating the TDM pattern, wherein the TDM pattern is configured to indicate the uplink resource and/or the downlink resource available for the UE;

sending the TDM pattern to the UE, to enable the UE to perform a transmission control according to the TDM pattern;

sending the DCI of the UL grant; and cancelling receiving UL information scheduled by the UL grant, when the uplink resource indicated by the DCI conflicts with the uplink resource indicated by the TDM pattern;

wherein the uplink resource indicated by the DCI conflicting with the uplink resource indicated by the TDM pattern comprises: the uplink resource indicated by the DCI being within the uplink resource of another base station which is indicated by the TDM pattern.

* * * * *